(12) United States Patent
Dueringer et al.

(10) Patent No.: US 8,496,467 B2
(45) Date of Patent: Jul. 30, 2013

(54) PROCESS AND DEVICE FOR PRODUCING HOLLOW BODIES

(75) Inventors: Markus Dueringer, Fussach (AT); Martin Hammerle, Sulz (AT)

(73) Assignee: Soplar SA, Altstatten (CH)

( * ) Notice: Subject to any disclaimer, the term of this patent is extended or adjusted under 35 U.S.C. 154(b) by 497 days.

(21) Appl. No.: 12/875,162

(22) Filed: Sep. 3, 2010

(65) Prior Publication Data

US 2010/0330219 A1  Dec. 30, 2010

Related U.S. Application Data

(62) Division of application No. 10/547,192, filed as application No. PCT/CH2004/000047 on Jan. 29, 2004, now Pat. No. 7,837,926.

(30) Foreign Application Priority Data

Mar. 5, 2003  (CH) .................................. 341/03
Mar. 25, 2003  (CH) .................................. 517/03

(51) Int. Cl.
  *B29C 49/04* (2006.01)
  *B29C 49/50* (2006.01)
  *B29C 49/70* (2006.01)

(52) U.S. Cl.
  USPC ............ 425/527; 425/532; 425/535; 425/537

(58) Field of Classification Search
  USPC .................................. 425/527, 532, 535, 537
  See application file for complete search history.

(56) References Cited

U.S. PATENT DOCUMENTS

| 2,288,454 | A |   | 6/1942  | Hobson |        |
|-----------|---|---|---------|--------|--------|
| 2,928,120 | A | * | 3/1960  | Leghorn et al. | 264/533 |
| 2,988,776 | A | * | 6/1961  | Schaich | 425/532 |
| 2,994,103 | A | * | 8/1961  | Schaich | 425/527 |
| 3,003,187 | A | * | 10/1961 | Schaich | 425/527 |
| 3,075,239 | A | * | 1/1963  | Strong | 425/532 |
| 3,115,673 | A | * | 12/1963 | Rudolph | 425/535 |
| 3,163,690 | A |   | 12/1964 | Scott |        |
| 3,204,018 | A | * | 8/1965  | Hagen | 425/532 |

(Continued)

FOREIGN PATENT DOCUMENTS

NL  278810  6/1962
WO  WO 02/081180 A1  10/2002

OTHER PUBLICATIONS

International Search Report (PCT/ISA/210) issued on May 27, 2004, by Swiss Patent Office as the International Searching Authority for International Application No. PCT/CH2004/000047.

*Primary Examiner* — Robert B Davis
(74) *Attorney, Agent, or Firm* — Buchanan Ingersoll & Rooney PC

(57) ABSTRACT

A device and method are disclosed for the production of hollow bodies, especially plastic bottles, wherein a section of a plastic flexible hose is placed in a cavity of a blow mold by an extruder head according to a predefined clocked pulse. The plastic flexible hose is inflated inside the blow mold by a blow mandrel by overpressure according to the blow mold cavity. The manufactured inflated hollow body is subsequently removed from the mold. The plastic hose can be continually held on opposite sides of the blow mold arrangement during the entire extrusion and blow cycle.

12 Claims, 3 Drawing Sheets

U.S. PATENT DOCUMENTS

| | | | |
|---|---|---|---|
| 3,311,684 A | * 3/1967 | Heider | 425/532 |
| 3,340,569 A | * 9/1967 | Hagen | 425/532 |
| 3,345,690 A | * 10/1967 | Hagen | 425/532 |
| 4,155,696 A | * 5/1979 | Siard et al. | 425/537 |
| 4,806,092 A | 2/1989 | Linss et al. | |
| 5,330,342 A | 7/1994 | Linss et al. | |

* cited by examiner

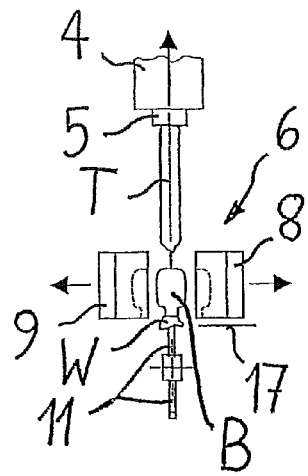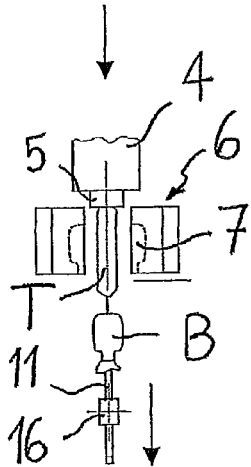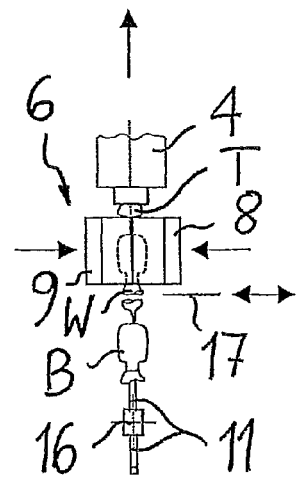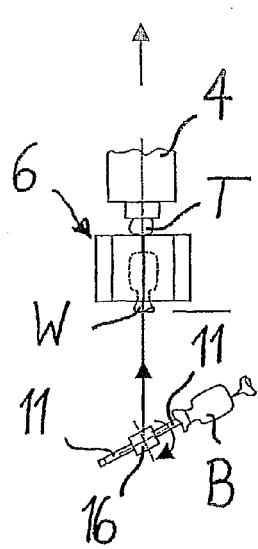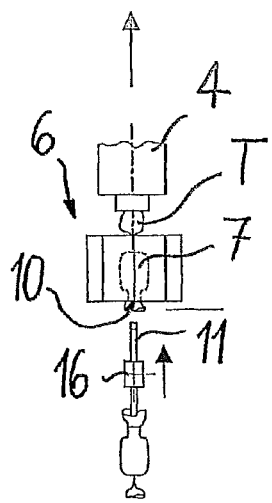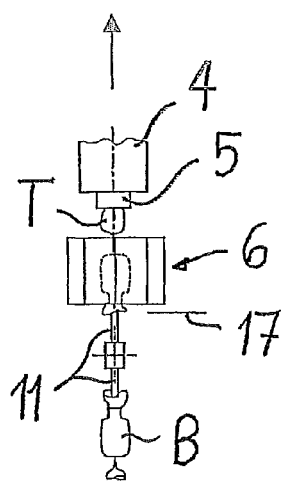

PROCESS AND DEVICE FOR PRODUCING HOLLOW BODIES

CROSS-REFERENCE TO RELATED APPLICATIONS

This application is a divisional of U.S. application Ser. No. 10/547,192 filed on May 5, 2006, which is a U.S. national stage application of International Application No. PCT/CH2004/000047 filed on Jan. 29, 2004 and which claims priority to Swiss Application Nos. 341/03 filed on Mar. 5, 2003 and 517/03 filed on Mar. 25, 2003, the entire contents of which are incorporated herein by reference.

BACKGROUND

Containers which were conventional in the past and which made of white or colored sheet metal, glass or also ceramic are being increasingly displaced by plastic containers. Mainly plastic containers are used for packaging of fluid substances, for example beverages, oil, cleaning agents, cosmetics, etc. The low weight and lower costs play a not insignificant part in this substitution. The use of recyclable plastic materials and overall more favorable total energy balance in their production also contribute to promoting the acceptance of plastic containers, especially plastic bottles, among consumers.

The production of plastic containers, especially plastic bottles, for example from polyethylene or polypropylene, takes place in an extrusion blowing process, especially in a process of blowing extruded tubes. In doing so a plastic tube is extruded from an extruder head, placed in blow molding tools, inflated by way of a blowing mandrel by overpressure, and hardened by cooling. The extrusion blowing machines used for this purpose generally have at least one extruder for supply of the plastic material. The output of the extruder is connected to the extruder head and on its discharge nozzle which can preferably be regulated in opening width an extruded tube or one extruded in several layers emerges. The extruded tube is transferred to a blow molding tool and inflated within its cavity with a blowing mandrel. The plastic tube can have one or more layers, it can be extruded as a tube with visual strips, decorative strips, or, relative to the periphery, with several segments for example of different colors.

The blowing station with the blowing mandrel is conventionally located laterally from the extrusion head and the blow molding tool which is supplied with the extruded tube must be moved into the blowing station where then the blowing mandrel is conventionally transported from overhead into the blow molding cavity. For continuous operation in one type of known extrusion blowing machines, there are conventionally two blowing stations. Each blowing station is equipped with one blow molding tool. The blowing stations are located opposite one another on either side of the extruder and have blow molding tables with the blow molding tools which are moved alternately under the extruder head in order to receive the extruded tube. In doing so the blow molding tool is opened for retrieving the tube. After closing the blow molding tool the tube is cut off between the extrusion head and the blow molding tool. Afterwards the blow molding table is moved again into the blowing station, where the blowing mandrel is transported into the cavity of the blow molding tool and the tube is inflated according to the blow molding cavity and afterwards removed. For multiple extrusion heads and multiple blow molding tools each blowing station is equipped with a corresponding number of blowing mandrels which are jointly transported into the blow molding cavities. Altogether the extruder with the extruder head and the two blow molding stations form roughly the shape of a T. The extruder with the extruder head constitutes the long leg of the T, while the two blowing tables can be moved alternately along the short crosspiece halves to under the extruder head.

Extrusion blowing machines of the above described type have been tested and allow high production performance. But there is still a desire for improvements in order to further reduce the required tool investments, i.e. the costs per blow molding cavity. The necessity of moving the blow molding tables with the blow molding tools laterally to the blowing stations leads to dead times which result from the path to be traversed and the speed of motion of the blow molding tables. Due to the relatively great masses which must be accelerated and braked again, the speed of motion can not be selected to be optionally large. Also the paths to be traversed laterally cannot be further shortened for construction reasons. The extruded tube must be cut off after the blow molding tool is filled. This conventionally takes place by a laterally supplied cutting blade. The tube part which continues to be extruded and which projects from the extrusion nozzle swings back and forth after the cutting process. In particular, for very high clock cycles the swinging of the tube can lead to problems in the transfer of the tube to the blow molding cavity.

Extrusion blowing machines are known in which a number of blow molding tools are located on a rotating wheel. The wheel stands roughly vertically and guides the blow molding tools roughly tangentially to the plastic tube which has been continuously extruded by the extrusion head. Shortly before reaching the extruded plastic tube, the guided blow molding tool is opened to retrieve the tube. As the wheel continues to turn, the blow molding tool is closed around the inserted tube and the latter is finally cut off during further turning. The arrangement of the blow molding tools and the speed of rotation of the wheel are chosen such that the tube is only cut off when the following blow molding tool has closed around the next tube piece. The tube which is located in the cavity of the blow molding tool as the wheel continues to turn finally travels into the blowing station where it is inflated by way of a blowing mandrel which is inserted laterally into the mold tool according to the blow molding cavity. Finally, the inflated hollow body is discharged from the blow molding tool by opening. The blow molding tool which is located on the rotating wheel is closed again as motion continues and is moved again to the extrusion head in order to accommodate another extruded tube.

The disadvantage in the wheel blowing machines is the circumstance that due to the large number of separate blow molding tools located on the wheel, they require a relatively high investment cost for preparation of the blow molding tools. In general the blow molding tools are not completely identical. This can lead to quality differences in the manufactured hollow bodies from blow molding tool to blow molding tool. The use of blow molding tools with several blow molding cavities is relatively difficult and expensive. The blow molding tools can only be attached at fixed mounting points on the wheel. They are fixed according to the height of the blown hollow body which can be produced at maximum with the machine. The mounting points, once established, can no longer be changed. This is also a result of the mechanical controls which are conventional in these machines via control cams, cam disks and the like. If containers with a smaller height are to be blown on the wheel blowing machine, the smaller blow molding tools mounted on the periphery of the wheel have a greater angular distance from one another. Since the plastic tube emerges continuously from the extrusion head, this leads to larger amounts of scrap in the areas between the two blow molding tools. The extruded plastic tube is accepted by the blow molding tool which has moved past along a circular shape under the extrusion head. Arc motion is superimposed on the lateral feed motion of the closing blow mold halves. By a radius of the wheel as large as possible, the attempt is made to keep this arc motion of the blow mold halves as small as possible when the plastic tube is being accepted; but it cannot be completely eliminated. The circumstance that the tube between two successive blow molding tools on the one hand is held by the extruder head and on the other hand by the advancing blow molding tool, cannot change anything in the geometrical relationships. Under certain circumstances therefore for more complex container geometries it can occur that the tube is not ideally inserted into the blowing cavity and is partially pinched between the adjoining areas of the closing blow mold halves. This can lead to unwanted scrap.

SUMMARY

A blow molding process and an extrusion blowing machine will be devised which allow reliable processing of different raw plastic products. With respect to the configuration of the container geometries there should be as much free space as possible, and containers with very complex geometry with very narrow specifications will also be producible. In the production of critical container geometries or thin-walled containers production reliability as high as possible is to be ensured. The process and device for extrusion blowing of hollow bodies will be compatible for production of large and small geometries. Unnecessary scrap is to be largely avoided. The process and the device are to be modified such that regardless of the number of cavities per blow molding tool, largely identical container properties and quality parameters will be achieved. The adjustment data determined in the test will be largely applicable unchanged to production plants. The space requirement compared to existing machines should not be greater, it should even be possible to reduce it. Dead times as occur in known machines when the blow molding tools move sideways into the blowing stations will be reduced.

In the process for producing hollow bodies, especially plastic bottles, a segment of a plastic tube is placed in a cavity of a blow molding tool by the extruder head in a definable cycle. Within the blow molding tool the plastic tube is inflated via a blowing mandrel by overpressure according to the blow molding cavity. The finish-blown hollow body is finally removed from the mold. As claimed in the invention the plastic tube is continuously held during the entire extrusion and blowing cycle on the opposing sides of the blow molding tool arrangement.

In the process as claimed in the invention the plastic tube is continuously held during an entire production cycle, i.e. during the entire extrusion and blowing cycle, on opposite sides of the blow molding tool arrangement. In this way the plastic tube is permanently guided and faulty positions can be avoided. This establishes the prerequisite for always placing a tube which has been extruded from an extrusion nozzle in the same blow molding cavity. All the hollow bodies produced with an extrusion nozzle-blow molding cavity arrangement are subject to the same adjustment and tool parameters in this way. Quality differences as a result of blow molding cavity tolerances of different sizes in arrangements with several different blow molding tools are eliminated. Dead times which take place by lateral displacement of the blow molding tool arrangement relative to the extruder head are eliminated, since the blow molding tool arrangement is aligned essentially only to the transport direction of the plastic tube. The plastic tube which is located in the blow molding cavity is inflated immediately after feed of the blow molding cavity with an extruded plastic tube. The plastic tube is kept in a defined position during the entire extrusion and blowing cycle and can no longer swing around its axis. The extruder head and the blow molding tool arrangement during the entire extrusion and blowing process remain in a definable and adjustable, geometrical positional relationship, and the plastic tube can always be optimally accepted. In this way, for complicated geometries of the blow molding cavity the danger of unintentional pinching of the plastic tube is reduced. The process guidance as claimed in the invention makes it possible if necessary to change in a concerted manner the location of the extruded plastic tube with reference to the blow molding cavity in order to take into account special geometrical requirements.

In one advantageous version of the process as claimed in the invention, the plastic tube is cut off only after complete inflation of the hollow body. The cutting-off can take place by controlled squeezing off or shearing off. Preferably a cutting blade or the like is used for this purpose. This process version differs both from the blowing process with the known wheel blowing machines in which the tube is sheared off essentially uncontrolled after acceptance by the blow molding tool as the wheel continues to turn, and also from the continuous and discontinuous blowing process with known extrusion blowing machines in which the plastic tube is cut in a controlled manner before the actual blowing process. The process guidance as claimed in the invention results in that the blowing mandrel must be synchronized for a certain time with the motion of the extruder head and/or the extrusion or transfer speed of the plastic tube to the blow molding tool arrangement. This simple measure however ensures that the tube is held in a controlled manner in each phase of the production cycle.

Separation of the plastic tube takes place advantageously on the side of the blow molding tool arrangement facing way from the extruder head. In this way the guidance of the tube over the finish-inflated hollow body which is located on the blowing mandrel and over the extruder head is ensured before cutting off. The tube material scrap can always be kept as small as possible regardless of the height of the blow molding cavity by the arrangement of the point of separation in the immediate vicinity of the mouth of the blow molding cavity.

With reference to the direction of motion of the plastic tube, the blow molding tool means is located between the extruder head and the blowing mandrel. The blowing mandrel is transported through the mouth of the blow molding cavity which is located on the side of the blow molding tool arrangement facing away from the extrusion nozzle. The output of the extrusion nozzle and the axial extension of the blowing mandrel are arranged such that they are essentially axially flush.

In one version of the invention, to reduce the dead times for each blow molding cavity there are two or more blowing mandrels. The blowing mandrels can be for example located next to one another and can supplied in alternation to the openings. In one alternative version several blowing mandrels are attached to the central blowing mandrel support such that they are used in succession by rotation of the blowing mandrel support. For example, the blowing mandrel support can carrying two blowing mandrels which are opposite one another offset by 180°. In this version, after inflating the tube and opening the blow molding tool arrangement the blowing mandrel support is turned by 180°. The second blowing mandrel is thus already prepared for inflation of another tube section while the hollow body on the first blowing mandrel still waits for its removal. It goes without saying that there can also be rotary blowing mandrel supports with 3, 4 or more blowing, mandrels. The angle by which the blowing mandrel support must continue to be turned derives from the division of 360° by the number of blowing mandrels.

The arrangement on the side of the blow molding tool arrangement facing away from the extrusion nozzle also offers the possibility of providing each blowing mandrel with a calibration means with which the opening of the blown hollow body is calibrated during the blowing process. In this way a separate finishing station in which this process must be repeated is eliminated.

In a continuous extrusion blowing process, the plastic tube is continuously extruded from the extrusion nozzle of the extruder head. After transfer of the extruded plastic tube to the blow molding cavity and during the entire blowing process, the relative distance of the extruder head from the blow molding tool arrangement is increased so that during further extrusion it does not strike the surface of the blow molding tool arrangement and the tube can be kept in a controlled alignment. This takes into account the circumstance that the plastic tube is continuously extruded from the extrusion nozzle while the inflation process in the mold cavity of the blow molding tool arrangement is a discontinuous process.

The relative change in the distance between the extruder head and the blow molding tool arrangement takes place at least with a speed which corresponds to the exit speed of the plastic tube from the extrusion nozzle. This ensures that the extruded tube does not run onto the surface of the blow molding tool arrangement. In the choice of a higher rate of change of the distance than the extrusion speed, the plastic tube which is clamped in areas in the blow molding tool arrangement is pulled therefore out of the nozzle tool. In this way for example the wall thickness of the extruded plastic tube can be changed in a concerted manner. A thin-walled tube can thus be produced with a relatively large nozzle gap. On the one hand this has the advantage that in spite of the high throughput the pressure in the extruder head can be kept comparatively low, and on the other hand the dissipation and thus the temperature increase in the tube become less. Another advantage is that even when processing highly swelling materials a thin-walled tube can be produced, since as a result of the larger nozzle gap and the associated lower shear the danger of a melt rupture is reduced. It can also be provided that the relative speeds between the extruder head and the blowing mandrel or blow mold during continuous tube discharge are changed continuously according to an stretching program in order to influence the tube wall thickness to the desired degree.

To achieve a change in distance between the extruder head and the blow molding tool arrangement, it is possible to move the extruder head or the blow molding tool arrangement away or to carry out a combination of the two movements. The adjustment of only one of the two equipment parts simplifies the construction and the control of the sequences of motion. For considerations of construction it is advantageous if the change in the distance takes place only by moving the extruder head away relative to the blow molding tool arrangement which is stationary with respect to its location. On the one hand, in the area of the extruder head there is more space for mounting of lifting means. On the other hand, it is advantageous for the feed of the blowing mandrel if the blow molding tool arrangement retains its position essentially unchanged during the entire blowing cycle. The blow molding tool arrangement must execute only one opening and closing motion for accommodating the tube section in the blow molding cavity. These processes can be controlled more easily and exactly if the blow molding tool arrangement does not execute any further motion.

In a discontinuous blowing process the plastic tube is extruded discontinuously from the extrusion nozzle of an extruder head which is made as a breaker head into blow molding cavity. During ejection of the plastic tube the distance of the blowing mandrel from the breaker head is increased. The structure of the extrusion blowing machine for the discontinuous process corresponds largely to that of continuous machines. In contrast to the known discontinuous process, however, the tube is permanently held and guided in a controlled manner during the production process. In this way uncontrolled swinging of the tube is prevented. Moreover holding the tube if necessary can also be used for controlled stretching or changing its position.

In the discontinuous process the tube must also be prevented from running onto the surface of the blow molding tool arrangement. To do this, the rate of change of the distance of the blowing mandrel from the breaker head is set to be greater than or equal to the ejection speed of the plastic tube from the extrusion nozzle.

The process as claimed in the invention in which the plastic tube is guided in a controlled manner during the entire production cycle allows process guidance with any direction of motion of the plastic tube. While the known processes are limited essentially to the vertical extrusion direction of the plastic tube, guidance of the tube also enables an oblique, even horizontal orientation. For reasons of compatibility with existing machines however axial alignment is preferred. An axially aligned arrangement of the extruder head, the blow molding tool arrangement and the blowing mandrel allows relatively simple control of the axial components of motion.

Advantageously the discharge rate of the plastic tube, the extruder head motion, the adjustment motion of the width of the extrusion nozzle, the blowing mandrel motion and the opening and closing motion of the blow molding tool arrangement can be adjusted individually and matched to one another. This allows implementation of optimized sequences of motion which are matched to the requirements of the container which is to be blown, without thus needing to undertake changes on the overall concept of the process as claimed in the invention. For example, it can be provided that the plastic tube during the production cycle is tilted in order to be able to optimally use special geometries of blow molding cavities and to produce special container geometries.

In one advantageous version of the invention the blow molding tool arrangement comprises at least two mold parts which can be separated from one another, and which are moved for opening and closing the blow molding tool essentially perpendicular to the extrusion direction out of an open end position into a closed end position and vice versa. For example it can be a blow molding tool which in addition to the mold parts for building up the container body also has a raisable bottom part. For a blow molding tool arrangement fixed in its position the actuating means can likewise be located stationary for the opening and closing process. Omitting an additional component of motion simplifies the mechanical structure and also contributes to reducing the control cost for the controlled movements of the mold parts.

The advantages of the process were explained using the example of an extruder head with only one extrusion nozzle and one blow molding tool arrangement with only one blow molding cavity. The blow molding tool arrangement can also be for example a single tool or an arrangement of tools with one or more blow molding cavities which are coupled to one another. In one advantageous process version an extruder head with a multiple extrusion nozzle tool and a blow molding tool arrangement which is equipped with a corresponding number of blow molding cavities are used. Moreover there is a number of blowing mandrels which is one or more times the number of blow molding cavities and which can be transported into the mouths of the blow molding cavities for inflating the plastic tubes. In this way, in one blowing cycle with the machine and tool parameters remaining the same, a larger number of hollow bodies, for example plastic bottles, can be produced. In this way the throughput is increased and the productivity of a multiple blow molding tool arrangement can be further improved.

An extrusion blowing device which is suited for executing the process as claimed in the invention for producing hollow bodies, especially plastic bottles, has an extruder head which is located in an equipment frame with an extrusion nozzle, a blow molding tool arrangement with at least one blow molding cavity, at least one blowing mandrel and at least one separation means. As claimed in the invention, on the opposing sides of the blow molding tool arrangement there are holding means for the plastic tube. The separating means is provided on the side of the blow molding tool arrangement facing away from the extruder head.

By providing holding means for the plastic tube on either side of the blowing tool arrangement, the tube is continuously held during the entire production cycle of a container. In this way the prerequisites for use of a single blow molding cavity per extrusion nozzle are created. Dead times by lateral movements of the blow molding tool means are avoided. Faulty positions are avoided by the permanent guidance of the plastic tube. If it appears to be necessary, the position of the tube can however also be changed in a concerted manner relative to the extrusion direction. In this way for example the requirements of more complicated container geometries can be taken into account. All the hollow bodies which are produced with an extrusion nozzle-blow molding tool arrangement are subject to the same adjustment and tool parameters. Quality differences as a result of tool tolerances of different sizes in several different blow molding tools are eliminated. Dead times which occur by the lateral displacement of the blow molding tool arrangement relative to the extruder head can be avoided since the blow molding tool arrangement is aligned essentially only to the transport direction of the plastic tube. The inflation of the plastic tube which is located in the blow molding cavity takes place directly after feed of the blow molding cavity with the extruded plastic tube. The plastic tube is fixed during the entire production cycle in a defined position and can no longer swing around its axis. The extruder head and the blow molding tool arrangement during the entire extrusion and blowing process remain essentially in a definable and adjustable, geometrical positional relationship, and the plastic tube can always be optimally accepted. In this way, even for more complicated geometries of the blow molding cavity, the danger of unintentional pinching of the plastic tube is reduced.

The holding devices for the tube on the one hand are formed by the blowing mandrel and on the other by the extruder head. By using already existing machine components for the holding functions the structure can be kept simple and the construction can be kept compact.

In an arrangement which is also advantageous for reasons of space, the blow molding tool arrangement is located between the extruder head and the blowing mandrel. The blow molding cavity has a mouth on the side of the blow molding tool arrangement facing away from the extrusion nozzle in which the blowing mandrel can be transported into the blow molding cavity. In this arrangement the adjustment and feed movements of the hardware components are limited essentially to movements along the direction of motion of the plastic tube or essentially vertically. This leads to lower mechanical stresses and reduces the vibrations and shaking which occur during operation.

One embodiment of the invention calls for two or more blowing mandrels which can be supplied in alternation for the blow molding cavity. In doing so the blowing mandrels can be located for example next to one another and can be moved alternatingly into the correct position. The transport paths of the blowing mandrels are very short. In this way the dead times for the feed of the blowing mandrel can be kept short. One alternative version calls for the blowing mandrels to be mounted on a central blowing mandrel support, and to be brought into use in succession by rotation of the blowing mandrel support. For example, the blowing mandrel support can bear two blowing mandrels which are opposite one another offset by 180°. In this version, after inflating the tube and opening the blow molding tool, the blowing mandrel support is turned by 180°. The second blowing mandrel is thus already prepared for inflation of another tube section, while the hollow body on the first blowing mandrel waits for its removal. It goes without saying that rotary blowing mandrel supports with 3, 4 or more blowing mandrels can also be provided. The angle by which the blowing mandrel support must continue to be turned then results from the division of 360° by the number of blowing mandrels.

Advantageously, on each blowing mandrel there are calibration means with which during the blowing process the opening of the blown hollow body can be calibrated. In this way a time-consuming finishing step can be eliminated.

To prevent the plastic tube from running against hardware components or sagging during the extrusion and blowing cycle, there are actuating means with which the relative distance between the extruder head and the blow molding tool arrangement can be adjusted. One advantageous version calls for the extruder head to be connected to the actuating means and the distance relative to the stationary blow molding tool arrangement to be adjustable. This arrangement has the advantage that on the blow molding tool arrangement precautions need be taken essentially only for the opening and closing of the mold parts. This simplifies the sequences of motion and the control cost.

The extruder head can be made for continuous extrusion of the plastic tube. In this version the change in the distance between the extruder head and the blow molding tool arrangement takes place at least with the extrusion speed of the plastic tube. In one alternative version of the invention the extruder head is made as a breaker head for discontinuous ejection of the plastic tube. In this version, the distance of the blowing mandrel can be adjusted at least with the ejection rate of the plastic tube relative to the blow molding tool arrangement.

Since on both sides of the blow molding tool arrangement there are holding means for the plastic tube, the alignment of the extrusion nozzle, the blow molding tool arrangement and the blowing mandrel or mandrels can be selected at will. For reasons of compatibility with existing devices and system components, however an arrangement is preferred in which the extruder head has an essentially vertically aligned extrusion nozzle and the blow molding tool arrangement and the blowing mandrel or mandrels are arranged vertically under one another. The vertical arrangement also uses the action of gravity on the extruded plastic tube which is stabilizing to a certain extent.

The blow molding tool arrangement comprises at a least two mold parts which can be separated from one another and which can be moved for opening and closing essentially perpendicular to the extrusion direction of the plastic tube out of an open end position into a closed end position and vice versa. For example, it can be a blow molding tool which in addition to the mold parts for building up a container body also has a raisable bottom part. For a blow molding tool arrangement which is fixed in its position the actuating means for the opening and closing process can likewise be located stationary. Omitting an additional movement component simplifies the mechanical structure and also contributes to reducing the control cost for controlled movements of the mold parts.

For reasons of higher throughput, it is advantageous if the extruder head has several extrusion nozzles and the blow molding tool arrangement is equipped with a corresponding number of blow molding cavities. Preferably there are a number of blowing mandrels which is one or more times the number of blow molding cavities. Aside from the higher throughput and the improved productivity of the multiple blow molding tool, in this version a larger number of hollow bodies, for example, plastic bottles, can be produced with uniform machine and tool parameters in one blowing cycle. This has advantages with respect to the uniformity of the quality of the products made.

Other advantages and features of the invention result from the following description with reference to the schematics of one embodiment.

BRIEF DESCRIPTION OF THE DRAWINGS

FIGS. 3-11 show schematics for explanation of the process as claimed in the invention.

DETAILED DESCRIPTION

Figure 1:
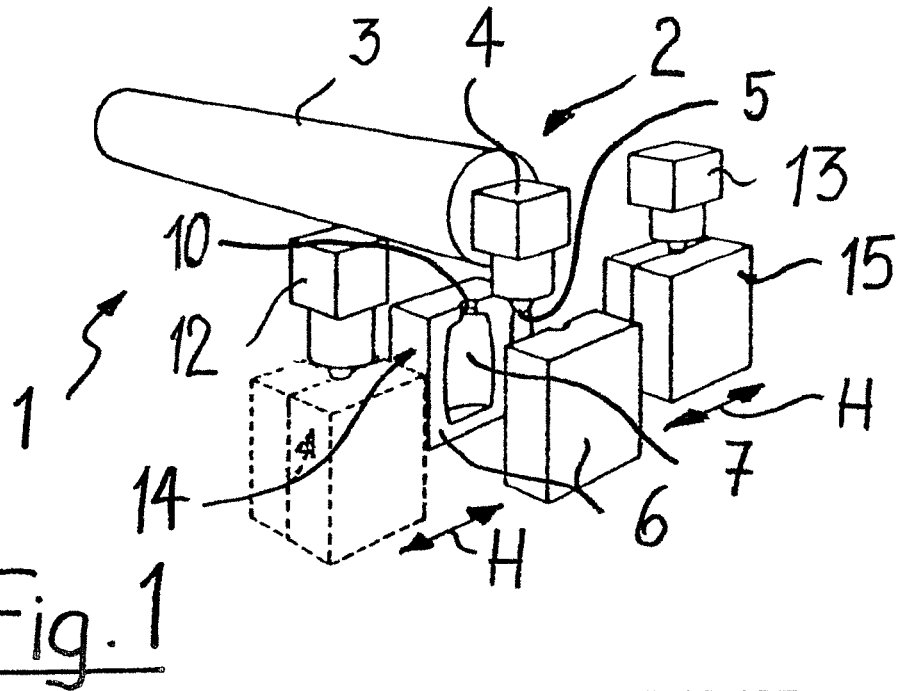
FIG. 1 shows a schematic of an extrusion blowing machine of the prior art.

The extrusion blowing machine of the prior art shown only schematically in FIG. 1 is labelled overall with reference number 1. The structure of these long-stroke extrusion blowing machines has been known for a long time and is described for example in *Blow Molding Handbook*, edited by Donald V. Rosato and Dominick V. Rosato, 1989, ISBN 1-56990-089-2, Library of Congress Catalog Card Number 88-016270. FIG. 1 is therefore limited to the components of the extrusion blowing machine 1 which are absolutely essential for understanding. This embodiment is a two-station blowing machine, as is also offered by the applicant. It has an extrusion unit 2 and two blowing stations 12, 13. The extrusion unit 2 comprises an extruder 3 for the plastic granulate and an extruder head 4 which is connected to it and which has at least one extrusion nozzle 5. The blowing stations 12, 13 each have one blowing head with a blowing mandrel. Each blowing station 12, 13 is equipped with a blow molding table 14, 15 in which blow molding tools 6 are mounted. The blow molding tools 6 each surround a blow molding cavity 7 which corresponds to the shape of the hollow body which is to be produced, for example a bottle. The blow molding cavities 7 on their top facing the extruder head 4 have a mouth 8. The blow molding tables 14, 15 can be moved in alternation out of their side end positions in the blowing stations 12, 13 into a position in which the mouth 8 of the blow molding tool 6 is axially flush with the output of the extrusion nozzle 5. The lateral displacement of the blow molding tables 14, 15 takes place essentially perpendicular to the lengthwise extension of the extruder 3.

The plastic granulate which is supplied via the extruder 3 is melted in the extruder 3 and/or in the extruder head 4 and is extruded from the extrusion nozzle 5 as a continuous tube. The tube can be extruded in one or more layers. To do this there can also be other extruders which transport the required different plastic materials to the extruder head 4. The blow molding tables 14, 15 with the blow molding tools 6 are moved in alternation out of their end positions into the blowing stations 12, 13 laterally to under the extruder head 4, the blow molding tools 6 are opened and a piece of the extruded tube is retrieved. Afterwards the respective blow molding table 14, 15 is moved back again into its end position in the blowing station 12 and 13. There, the hollow body is inflated using a blowing mandrel which has been transported into the cavity 7 through the mouth 8. The finished hollow body is ejected and the cycle repeated. While a tube is being inflated in one blow molding station 12, the blow molding table 15 of the second blowing station 13 is moved laterally to under the extrusion head 4 in order to retrieve another piece of the extruded tube. In this way continuous operation is possible.

Figure 2:
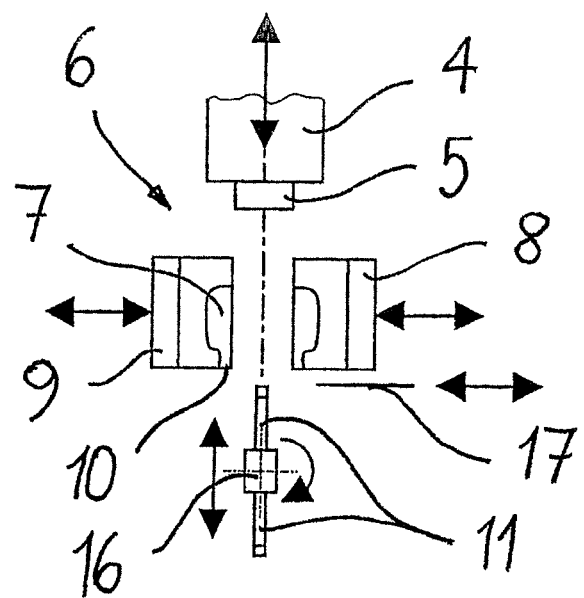
FIG. 2 shows a diagram of an arrangement of an extruder head, a mold tool and a blowing mandrel as claimed in the invention.

FIG. 2 schematically shows an arrangement of the hardware components important to the invention. Here the designations from FIG. 1 were retained in order to enable direct comparison. Reference number 4 in turn labels the extruder head which has the extrusion nozzle 5. Reference number 6 stands for the single blow molding tool of the extrusion blowing device which in this embodiment comprises two blow mold halves 8, 9 which are shown in the opened state. The two blow mold halves 8, 9 border the blow molding cavity 7 with a mouth 10 which is located on the side of the blow molding tool facing away from the extrusion nozzle 5. Proceeding from a practical arrangement of the hardware components, the mouth 10 of the blow molding cavity 7 is on the bottom of the blow molding tool 6. A blowing mandrel which is labelled with reference number 11 is mounted on the blowing mandrel support 16. In this embodiment the blowing mandrel support 16 has two blowing mandrels 16 which can be moved alternately to under the mouth 10 of the blow molding cavity 7 by turning the blowing mandrel support 16 by 180°. The extruder head 4 and the sole blow molding tool 6 are arranged such that the axis of the blow molding cavity 7 and the output of the extrusion nozzle 5 on the extruder head 4 are axially flush with one another. In the embodiment shown, the blowing mandrel pair 11 is also arranged such that it is flush with the axis of the blow molding cavity 7. This however is not a compelling requirement. It goes without saying that for an eccentrically arranged mouth of the blow molding cavity the blowing mandrel can be accordingly offset laterally. But it is important to the arrangement as claimed in the invention that the extruder head 4 and the blow molding tool 6 are flush with one another in the axial direction. Reference number 17 labels a blade which is used to cut off the individual blown hollow bodies.

The arrows shown in FIG. 2 indicate the adjustability of the individual hardware components. Thus, the extruder head 4 can be adjusted essentially only with respect to its height in order to change the distance to the blow molding tool 6 during the extrusion and blowing process. For the required base setting and fine adjustment however it has all degrees of freedom. The blow mold halves 8, 9 of the blow molding tool 6 can only be moved laterally out of an open end position into a closed end position and vice versa. In the embodiment shown, the blow molding tool 6 does not have vertical adjustability. The blowing mandrel pair 11 which is mounted on the blowing mandrel support 16 is vertically adjustable in order to be able to be transported into the mouth 10 of the blow molding cavity 7 and withdrawn again. In order to be able to use the blowing mandrels 11 in alternation, the blowing mandrel support 16 can also be turned.

Figure 3:
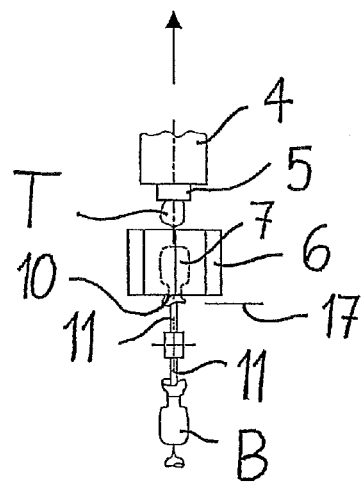
Figure 4:
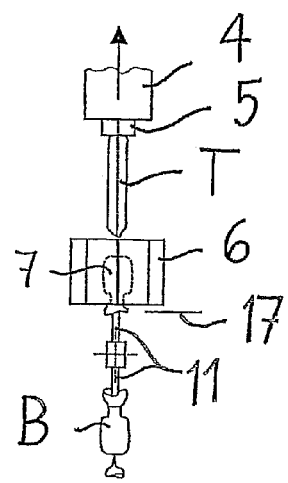

FIGS. 3 to 11 serve to explain the process for production of a plastic hollow body. FIG. 3 shows the automatic cycle beginning with the state in which the blow molding tool 6 is closed. The tube T which has been continuously extruded from the extrusion nozzle 5 of the extruder head 4 is indicated by T. One of the two blowing mandrels 11 is transported into the mouth 10 of the blow molding cavity 7. Reference number 17 stands for the blade which is inactive in this state. In the state shown in FIG. 3 a tube which is located in the blow molding cavity is inflated according to the blow molding cavity. During the blowing process the extruder head 4 is continuously raised and the vertical distance to the blow molding tool is continuously increased. This is indicated in FIG. 4 by the lengthening of the extruded tube T. If the extruder head is raised with a speed which is greater than the extrusion speed of the plastic tube, the tube is pulled out of the extrusion nozzle and stretched, and its wall thickness decreases. During raising of the extruder head 4 if necessary a wall thickness control program can be run in which the wall thickness of the tube can be changed to the desired extent by varying the gap width of the extrusion nozzle. A finish-blown bottle B hangs on the second blowing mandrel 11 which is located outside the blow molding cavity. In this position it could be subjected for example to an aftercooling process or other finishing which is not detailed.

Figure 5:
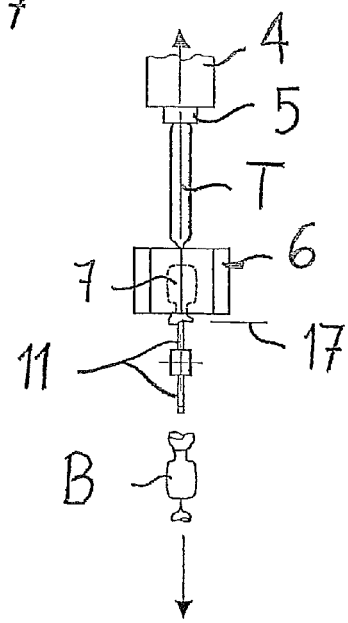

The end of the blowing process is shown in FIG. 5. The extruder head 4 is moved still further from the blow molding tool 6 and is raised further. The inflated bottle which is located in the blow molding cavity 7 is vented by the blow molding tool 6. The bottle B hanging on the lower blowing mandrel 11 is removed. After this process, the blow mold halves 8, 9 of the blow molding tool 6 are raised; this is indicated in FIG. 6. The extruder head 4 is still being raised in doing so. After the bottle B which has been inflated in the blow molding cavity has been completely removed from the blow molding cavity 7, the movement of the extruder head 4 is stopped and vice versa. As is shown in FIG. 7, the extruder head 4 with the extruded tube piece T and the finish-blown bottle B which is still connected to it is moved down in the direction of the blow molding tool 6. The blowing mandrel 11 which is mounted on the blowing mandrel support 16 is likewise lowered.

FIGS. 6 and 7 clearly show that the extruded tube T even with the blow molding tool 6 opened is held in a position which is aligned in an axially defined manner. Because the tube is still connected to the finish-blown container B, the tube on the one hand is fixed by the extrusion nozzle 6 and on the other via the blowing mandrel 11. In this way swinging of the tube T is reliably prevented. The rate of lowering of the extrusion head 4 and of the blowing mandrel 11 takes place advantageously synchronously and corresponds at least to the extrusion speed of the tube T. By a definable difference of lowering speeds the continuously extruded tube T can be stretched to the desired extent. The axially aligned arrangement of the extruder head 4, of the blow molding tool 6 and of the blowing mandrel 6 also allows relatively simple control of the axial components of motion. Advantageously the exit speed of the plastic tube T, the motion of the blowing mandrel 11 and the adjustment motion of the width of the extrusion nozzle 5 can be adjusted individually and matched to one another. This allows implementation of optimized motion sequences which are matched to the requirements of the container B which is to be blown without in this way needing to undertake changes in the overall concept of the axially aligned motion.

FIG. 8 shows the state in which the blowing mandrel support 16 has reached its lowest position. At this point, the halves of the blow molding tool 6 are closed again in order to inject a new tube section in the mold cavity. Shortly before the blow molding tool 6 is completely closed, the blade 17 is supplied laterally in order to separate the finish-blown bottle B from the scrap piece projecting out of the mouth of the blow molding cavity. This is indicated in FIG. 8 by a double arrow. The extruder head 4 in the meantime has again reversed its direction of motion and is raised again. After separation, the blowing mandrel support 16 is turned in order to align the second blowing mandrel 11 to the mouth of the blow molding cavity. During rotation of the blowing mandrel support 16 it can be supplied to the blow molding tool 6. The rotation and vertical adjustment of the blowing mandrel support 16 are shown in FIG. 9 by the corresponding arrows. During this process the extruder head 4 is raised again. FIG. 10 shows the state in which the rotation process of the blowing mandrel support 16 has been completed and the blowing mandrel 11 has reached its correct stroke position. Afterwards it is transported into the mouth 10 of the blow molding cavity 7. In doing so the later opening of the bottle to be inflated is calibrated. Preliminary blowing can be started during transport of the blowing mandrel 11 into the blow molding cavity 7. The extruder head 4 is raised further in doing so. In FIG. 11 the blowing mandrel 11 is finally transported into the blowing mandrel cavity of the blow molding tool 6 and the production cycle starts again from the front. FIG. 11 corresponds to FIG. 3 here.

The schematics show an extruder head with only one extrusion nozzle and a blow molding tool with only one blow molding cavity. It goes without saying that the described arrangement and the described process can also be used in extrusion blowing devices with multiple nozzle tools and multiple blow molding tools or arrangements of single and/or multiple blow molding tools. The number of blowing mandrels is matched to the number of blow molding cavities here.

The invention has been explained using the example of a continuous extrusion blowing process and a corresponding devised device with a vertical arrangement of the extruder head, of the blow molding tool, and of the blowing mandrels. It goes without saying that the hardware components can also be arranged in a horizontal or any alignment according to the extrusion direction. The process as claimed in the invention can also be used in a discontinuous extrusion blowing process and accordingly a discontinuous extrusion blowing machine can also be produced. The decisive factors in a discontinuous process are likewise providing holding means for the tube on either side of the blow molding tool arrangement and the sequence of the arrangement of the extruder head, the blow molding tool arrangement and the blowing mandrel. It is important to the invention that the extruded tube is held in a controllable position during the entire production cycle and the tube is cut off only after inflation and removal of the container from the mold. The point of separation is located on the side of the blow molding tool arrangement facing away from the extruder head.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A device for producing hollow bodies, comprising: an extruder head which is located in an equipment frame with an extrusion nozzle, a blow molding tool arrangement with a blow molding cavity, and at least one blowing mandrel, the extruder head, the blow molding tool arrangement and the at least one blowing mandrel being arranged in an axial relationship and at least one separation means for a plastic tube, wherein on opposing sides of the blow molding tool arrangement there are holding means for the plastic tube and the separation means is located on a side of the blow molding tool arrangement facing away from the extruder head, and an activator with which a relative axial distance between the extruder head and an end face of the blow molding tool arrangement can be adjusted.

2. Device as claimed in claim 1, wherein the holding means for the plastic tube are the extruder head and the blowing mandrel.

3. Device as claimed in claim 1, wherein the blow molding tool arrangement is located between the extruder head and the blowing mandrel, and the blow molding cavity on a side of the blow molding tool arrangement facing away from the extrusion nozzle has a mouth through which the blowing mandrel can be transported into the blow molding cavity.

4. Device as claimed in claim 3, wherein for each blow molding cavity there are two or more blowing mandrels which are transported in alternation into the blow molding cavity.

5. Device as claimed in claim 3, wherein the blowing mandrels are mounted on a central blowing mandrel support for use in succession by rotation of a blowing mandrel support.

6. Device as claimed in claim 1, wherein each blowing mandrel is provided with a calibration means with which an opening of a hollow body can be calibrated during a blowing process.

7. Device as claimed in claim 1, wherein the actuating means are connected to the extruder head.

8. Device as claimed in claim 1, wherein the extruder head is made for continuous extrusion of the plastic tube.

9. Device as claimed in claim 1, wherein the extruder head is made as a breaker head for discontinuous ejection of the plastic tube, and a distance of at least one blowing mandrel at least with an ejection speed of the plastic tube can be adjusted relative to the blow molding tool arrangement.

10. Device as claimed in claim 1, wherein the extruder head has an essentially vertically aligned extrusion nozzle and the blow molding tool arrangement and at least one blowing mandrel are arranged vertically under one another.

11. Device as claimed in claim 1, wherein the blow molding tool arrangement comprises at least two mold parts which can be separated from one another and which are moved for opening and closing the blow molding tool essentially perpendicular to an extrusion direction of the plastic tube out of an open end position into a closed end position and vice versa.

12. Device as claimed in claim 1, wherein the extruder head has several extrusion nozzles, the blow molding tool arrangement is equipped with a corresponding number of blow molding cavities, and there is a number of blowing mandrels which is one or more times the number of blow molding cavities.

* * * * *